Patented July 13, 1943

2,323,990

UNITED STATES PATENT OFFICE 2,323,990

PROCESS FOR CARRYING OUT ANION EXCHANGE REACTIONS

Lothar Gerb, Berlin-Charlottenburg, Germany, assignor to The Permutit Company, New York, N. Y., a corporation of Delaware No Drawing. Application May 13, 1941, Serial No. 393,243. In Germany July 30, 1940

9 Claims. (Cl. 210—24)

This invention relates to a process for carrying out anion exchange reactions in aqueous solutions by means of organic anion exchange materials, and it comprises maintaining the content of dissolved oxygen in the aqueous solution at a value below about one part per million while said reactions take place, all as more fully described hereinafter, and as claimed.

For the removal of salts from water and other aqueous salt solutions there are being used to an ever increasing extent materials capable of removing cations and other materials capable of removing anions from aqueous solutions. In carrying out this process the metallic cations are first removed by passing the solution through a bed of cation exchange material containing hydrogen as the exchangeable cation; this leaves free acids in the solution. Subsequently, the anions are removed by passing the solution through a bed of anion exchange material containing or forming hydroxyl as the exchangeable anion. All that is left of the original salt after this second step is water.

In both steps of this process exchange materials of organic origin are used almost exclusively, the anion exchange material being an organic substance containing or forming basic hydroxyl groups such as organic basic dyestuffs which are insoluble in water and weakly acid or alkaline solutions, e. g. anilin black, the intermediate products of the anilin black group, such as emeraldine, nigranilin and the like, as well as anion exchanging resins made by condensation from aromatic amines and aldehydes, especially m-phenylene diamine and formaldehyde.

Upon working extensively with such organic anion exchange materials containing hydroxyl groups I found that during extended use the anion exchange capacity frequently decreased, that is to say, the ability of the material to remove anions became smaller, frequently dropping to as low as half the original value. This is, of course, highly undesirable since it makes it necessary to choose the quantity of anion exchange material to be used on any particular job, and thus the size of container in which this material is placed, on the basis of the ultimate reduced exchange capacity.

One object of my invention is to prevent this loss of exchange capacity in prolonged use of organic anion exchange material. Another object is, to accomplish this with means beneficially affecting the character of the aqueous solution in other respects.

I have made the surprising discovery that appreciable quantities of oxygen dissolved in the solution being treated are responsible for a detrimental change in the organic substances containing hydroxyl groups and used as anion exchange material, resulting in the aforesaid gradual reduction of the anion exchange capacity. If, according to my invention, the amount of dissolved oxygen is maintained below about one part per million, in the solution being treated with such anion exchange material, a reduction of the anion exchange capacity is prevented and even in prolonged use the capacity remains practically constant at its original value.

In some cases the aqueous solution to be treated has naturally an oxygen content not exceeding about one part per million, as, for instance, in the case of certain well waters. In such cases it is sufficient to take good care that no additional oxygen is absorbed by the solution before the anion exchange reactions have been completed. To this end, any exposure of the solution to the atmosphere must be carefully prevented. Stuffing boxes and pipe joints on the suction side of pumps must be kept absolutely tight to prevent sucking in air.

If the dissolved oxygen content of the solution exceeds about one part per million it must be reduced below that value by any one of a number of means such as those known in the art of water treatment. The oxygen may be driven off, as for example in a vacuum degasifier, or it may be chemically combined by treating the solution with metals or metal compounds which, under suitable conditions, remove the oxygen from solution by oxidation, or by changing from an oxide of lower order to one of higher order, respectively.

According to a further aspect of my invention it is particularly advantageous to chemically combine the dissolved oxygen by the use of substances which, upon oxidation by the oxygen dissolved in the solution, or due to the hydrolysing effect of the solution, form metal hydroxides capable of binding silica. In that event the removal of oxygen by the formation of metal hydroxide at the same time brings about the highly beneficial result of reducing the undesirable silica found in most aqueous solutions, such as natural water supplies. Substances suitable for this purpose are ferrous compounds, such as ferrous sulfate, but preferably those compounds which introduce no disturbing anions into the liquid, e. g. ferrous hydroxide or ferrous compounds of weak acids such as carbonic acid, or else metals, such as metallic and, advantageously, activated iron, or aluminum, zinc, magnesium, or their alloys. If the extent of silica removal by the hydroxides formed in the oxygen removal is considered insufficient in any particular case, additional quantities of such metal hydroxides or of substances bringing about the formation of such hydroxides may be fed to the solution for further silica removal.

Another good way of practising my invention is to pass a portion of the acid solution to be subjected to anion exchange (which solution may, for instance, have been subjected to hydrogen exchange treatment) over metallic iron, thereby charging it with ferrous salts, and then mixing this portion with the untreated solution. In this procedure it is necessary, however, that the solution contains the alkalinity required for neutralization. If that is not the case such alkalinity must be produced, as by the addition of lime, but then there will be a corresponding increase in the cation content of the solution. After separating out the precipitated metal hydroxides the mixture is then treated with hydrogen exchange material, after completing the silica removal in the manner previously described, if so desired.

The proportion of the solution to be passed over metallic iron depends upon the amounts present in the solution of iron-dissolving anions, such as carbonic, hydrochloric or sulfuric acid, as well as the amount of dissolved oxygen to be chemically combined; an additional amount of iron may be brought into solution where further silica removal is wanted. It may even be that all of the solution must be passed over iron. In that case, however, the hydrogen ion concentration must then be raised by the addition of lime, calcium carbonate or the like in order to precipitate the metal hydroxides. Although this preserves the advantage of not bringing additional anions into the solution, this procedure does again introduce cations which must be removed by (a second) treatment with cation exchange material containing hydrogen as the exchangeable cation, all prior to the anion exchange reaction. Another modification is to introduce by passage over metallic iron only the quantity of ferrous ions required to combine with the dissolved oxygen and to bring additional metal ions into solution by the use of other metals. This procedure is only applicable, however, if not all the anions in the solution are needed to produce the ferrous ions required for oxygen removal. It is to be noted in this connection that oxygen is chemically combined even when metals other than iron are brought into solution.

Another good way of introducing ferrous ions into the solution is by the use of electrolytic means. This may be accomplished by flowing the solution past iron electrodes, the quantity of ferrous ions introduced in this manner being regulated by a suitable choice of electrode surface and by appropriate adjustment of the electric current strength. This method has the advantages that the iron is added without, at the same time, introducing any salts, and that the quantity of ions introduced may be regulated reliably and accurately to suit the requirements.

The following results of comparative tests, given as example, illustrate clearly the effectiveness of the process in accordance with my invention:

The anion exchange capacity of an organic anion exchange material containing or forming basic hydroxyl groups (emeraldin), not previously used for anion exchange, was equivalent to 6 to 8 g. CaO per liter of the material. After prolonged use of this material for de-acidifying water containing from 7 to 9 parts per million of oxygen, this exchange capacity dropped to a value equivalent to about 4 g. CaO per liter, a loss of about 33 to 50% of the original capacity. When a quantity of the same material was used, on the other hand, to de-acidify water, the dissolved oxygen content of which had been reduced to not more than 1 part per million by one of the methods according to my invention, even very prolonged use under otherwise identical operating conditions did not bring about any drop of the anion exchange capacity. Similar results were obtained with other anion exchange materials, e. g. those of resinous nature, made by condensation of aromatic amines with aldehydes.

What I claim is:

1. A process for treating an aqueous solution containing anions which comprises maintaining the content of dissolved oxygen in said aqueous solution at a value below about one part per million and passing said aqueous solution in contact with anion exchange material containing basic hydroxyl groups while the dissolved oxygen content is maintained at said value.

2. A process for treating an aqueous solution containing anions which comprises reducing the content of dissolved oxygen in said aqueous solution to a value below about one part per million and then passing said aqueous solution in contact with anion exchange material containing basic hydroxyl groups.

3. The process of claim 2 in which the content of dissolved oxygen is reduced by degasifying the aqueous solution under a vacuum.

4. The process of claim 2 in which the content of dissolved oxygen is reduced by introducing into the aqueous solution ferrous ions by electrolyzing iron in contact with the aqueous solution.

5. A process for removing silica from as well as carrying out anion exchange reactions in an aqueous solution containing anions which comprises reducing the content of dissolved oxygen by treating the aqueous solution with a compound of a metal capable of reacting with the dissolved oxygen in the aqueous solution to form a silica binding hydroxide, and then passing said aqueous solution in contact with anion exchange material containing basic hydroxyl groups.

6. A process for carrying out anion exchange reactions in an aqueous solution containing anions, which comprises the steps of treating said solution with a hydrogen ion exchange material, then contacting said solution with metallic iron, and finally treating said solution with an anion exchange material containing basic hydroxyl groups.

7. The process of claim 6 in which a predetermined proportion of the aqueous solution is by-passed around the steps of treating with hydrogen ion exchange material and of contacting with metallic iron and then reunited with the remaining portion of said solution prior to treating said solution with said anion exchange material.

8. A process of treating an aqueous solution of electrolytes which comprises the steps of treating said solution with a hydrogen ion exchange material, then contacting said solution with metallic iron, then treating said solution with an alkaline substance and thereby increasing the hydrogen ion concentration sufficiently to precipitate iron hydroxide, and finally treating said solution with an anion exchange material containing basic hydroxyl groups.

9. A process of treating an aqueous solution of electrolytes which comprises the steps of treating said solution with a hydrogen ion exchange material, then contacting said solution with metallic iron, then treating said solution with an alkaline substance to precipitate iron hydroxide, then treating said solution a second time with hydrogen ion exchange material, and finally treating said solution with an anion exchange material containing basic hydroxyl groups.

LOTHAR GERB.